Aug. 13, 1929.  W. RUNGE  1,724,146
HIGH FREQUENCY AMPLIFIER ARRANGEMENT
Filed Feb. 24, 1925
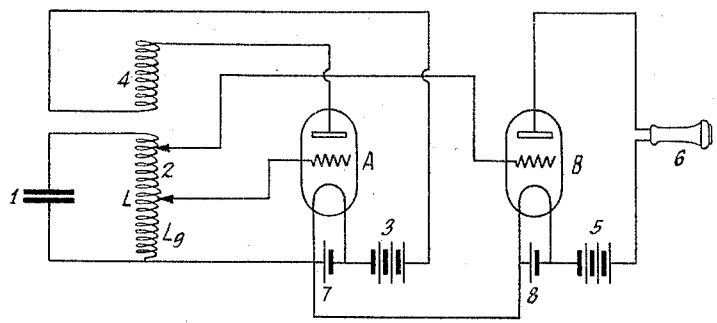
INVENTOR
WILHELM RUNGE
BY
ATTORNEY Patented Aug. 13, 1929.

1,724,146

UNITED STATES PATENT OFFICE.

WILHELM RUNGE, OF BERLIN, GERMANY, ASSIGNOR TO GESELLSCHAFT FUR DRAHT-LOSE TELEGRAPHIE M. B. H. HALLESCHES, OF BERLIN, GERMANY.

HIGH-FREQUENCY-AMPLIFIER ARRANGEMENT.

Application filed February 24, 1925, Serial No. 11,024, and in Germany March 13, 1924.

My invention relates broadly to radio receivers, and, more particularly, to means for coupling thermionic valves in cascade for receiving purposes.

An object of the invention is to provide such an arrangement in which the input of the second tube is derived from the same circuit as the input of the first tube, the first tube having its input and output circuits regeneratively coupled.

Other objects will be apparent from the following description and claims when considered with the accompanying drawing in which the single figure is a circuit embodying the principles of my invention.

In a tube arrangement for receiving purposes which includes means for reducing damping, the strength of the current in the said grid circuit in the presence of optimum regenerative coupling between anode circuit and grid circuit, depends upon the characteristic curve of the tube. The compensation of the resistance of the circuit by the tube is perfect only for small amplitudes. If, by far distance reception, an electromotive force is impressed upon the grid circuit, the current in the grid circuit is gradually amplified until a stop and limit is set to its growth by the departure of the tube characteristic from a straight line.

Hence, the damping reduction can not be increased "ad libitum" by increased regenerative coupling, but it is determined at the same time by the constants of the electron tube that is used. If one compares the energy consumed in the grid circuit with the energy furnished by the tube, there results for the case that at critical regenerative coupling the resistance of the circuit is just compensated. A certain relation between the current in the grid circuit and the potential then obtains at the grid of the tube; to be more precise, at constant far-distance reception, and at correct regenerative coupling, the current amplitude set up in the grid circuit is dependent upon the value of the grid coupling, and there holds this relation:

$$I = \sqrt[3]{\frac{1}{L_g^3}}$$

where I is the amplitude of the current, and $L_g$ the grid coupling, i. e., the portion of the inductance of the coil of the circuit from which the grid potential is taken.

It can be seen therefrom that with decreasing grid coupling the current intensity increases, and that, as a consequence, a larger current is obtained in the grid circuit when the grid potential is taken not from the total inductance, but only from a part thereof. For instance, if $L_g$=1/10th of the total value, I grows to about a 4.5−fold value of what the current amounted to at full grid coupling. Now, so far as the voltage is concerned which obtains at the total inductance L of the grid circuit, this voltage, as a consequence, likewise grows to a value of about 4.5 times greater than what it was at full coupling.

Now, the invention resides in that the voltage increase at the coil of the grid circuit, which is produced upon the use of the damping reduction in the manner described, is utilized in such a manner that the voltage across the entire coil, or a major portion thereof, is fed to the grid of another or next tube. With this arrangement the use of resistance coupling or interstage transformers is avoided, and furthermore the amount of regeneration (or critical point) is readily controlled by varying the inductance $L_g$ in the input circuit of the first tube A. The arrangement shown and described above is a contrast to general practice which has heretofore been to take the grid potential of the succeeding tube from a resistance inserted in the anode circuit of the tube preceding.

Referring to the figure of the drawing, the two amplifying tubes are denoted by the reference characters A and B. A circuit comprising a condenser 1 and inductance 2, connected in parallel, is coupled to any signal receiving means (not shown). The grid circuit of tube A is connected across a part of inductance 2. The plate circuit of tube A comprises B-battery 3 and tickler coil 4, tickler coil 4 being inductively coupled to inductance 2 to give the necessary feed-back.

The grid circuit of tube B is connected across a portion of inductance 2 larger than the portion across which the grid circuit of tube A is connected. The plate circuit of tube B includes B-battery 5 and telephone 6. The filaments of tubes A and B are heated by current from batteries 7 and 8 respectively.

Having described a single embodiment of my invention I am entitled to all modifications thereof as fall fairly within the spirit and scope of the following claims:

1. In combination, a first three element tube having its input and output circuits regeneratively coupled, a second three element amplifier tube and non-regeneratively associated input and output circuits, said latter tube having its input circuit coupled to the input circuit of said first tube, only a portion of said last coupling being common to both input circuits.

2. In combination, an inductance, a first three element tube having its input circuit coupled to a portion of said inductance, a tickler coil in the output circuit of said tube, the coupling between said inductance and said tickler coil being so arranged and the constants of said tube being such, that a very small coupling is sufficient to neutralize losses in said input circuit, a second tube having its input circuit coupled to a larger portion of said inductance than said first tube.

3. In combination, a receiving circuit, a first three element tube, means for coupling the input and output circuits of said tube causing regenerative action, means for coupling the input circuit of said tube to said receiving circuit, a second three element tube, and means for coupling the input circuit of said second tube to said receiving circuit, said first mentioned coupling to said receiving circuit being relatively small as compared with said second mentioned coupling with said receiving circuit.

4. A high frequency amplifier arrangement including a receiving circuit having inductance and capacitance, a first three element amplifier tube having its input circuit coupled to a portion of said inductance, the input and output circuits of said tube being regeneratively coupled, and a second three element tube having its input circuit coupled to a larger portion of said inductance than the input circuit of the first tube, whereby increased amplification in the second tube is obtained.

WILHELM RUNGE.